United States Patent [19]

Stanley et al.

[11] Patent Number: 5,039,216
[45] Date of Patent: * Aug. 13, 1991

[54] SPECTACLES WITH EXTRACTABLE TEMPLES

[75] Inventors: Smith B. Stanley, New York, N.Y.; Yoram Alroy, Tampa, Fla.

[73] Assignee: Designer Products Est., Vaduz, Liechtenstein

[*] Notice: The portion of the term of this patent subsequent to Oct. 11, 2005 has been disclaimed.

[21] Appl. No.: 469,274

[22] Filed: Jan. 24, 1990

Related U.S. Application Data

[63] Continuation of Ser. No. 229,560, Aug. 5, 1988, Pat. No. 4,932,772, which is a continuation-in-part of Ser. No. 782,487, Oct. 1, 1985, Pat. No. 4,776,686, which is a continuation-in-part of Ser. No. 526,116, Aug. 24, 1983, Pat. No. 4,560,258.

[51] Int. Cl.⁵ .................... G02C 5/20; G02C 5/14; G02C 5/22; G02C 11/02
[52] U.S. Cl. .................... 351/115; 351/120; 351/153; 351/51; 351/59
[58] Field of Search .................. 351/59, 63, 115, 119, 351/120, 121, 128, 153, 51, 52

[56] References Cited

U.S. PATENT DOCUMENTS

2,323,518  7/1943  Cochran .................. 351/63

Primary Examiner—Rodney B. Bovernick
Attorney, Agent, or Firm—Herbert Dubno

[57] ABSTRACT

A pair of spectacles has a pair of channels formed in the frame and receiving respective temples which can be retracted and swung into a position in which they lie transverse to the frame to bring them into the position of use. The bar forming the frame member is curved to conform to the head of the wearer at the brow and the temples are of high flexibility so that they can conform to the curvature of the channels in the bar as well as to the head of the wearer. In addition, the ends of the bar are provided with detents for retaining the temples in respective inwardly swung or use positions.

4 Claims, 7 Drawing Sheets

SPECTACLES WITH EXTRACTABLE TEMPLES

CROSS REFERENCE TO RELATED APPLICATIONS

This is a continuation of co-pending U.S. application Ser. No. 07/229,560 filed on Aug. 5, 1988, now U.S. Pat. No. 4,932,772, which is a continuation-in-part of our copending application 06/782,487 filed Oct. 1, 1985 (now U.S. Pat. No. 4,776,686) which was, in turn, a continuation-in-part of our then pending application Ser. No. 06/526,116 filed on Aug. 24, 1983 and now U.S. Pat. No. 4,560,258, issued Dec. 24, 1985.

FIELD OF THE INVENTION

The present invention relates to spectacles with extractable temples and, more particularly, to eyeglasses, sunglasses, stereoscopic-viewing glasses, polarized-lens glasses, eye-protective glasses, and the like, hereinafter referred to broadly as spectacles, composed of long-life or short-lived materials for repeated use or single-use applications for retention or disposal, and utilizing glass, or synthetic-resin (plastic) lenses, and which can be supplied or stored in a compact configuration whereby a temple is at least partly received in the bridgepiece between lenses or the frame structure overlying same.

BACKGROUND OF THE INVENTION

The usual pair of spectacles, as this term has been defined above, comprises a frame which may have a bridgepiece interconnecting a pair of window-forming portions which can be provided with respective lenses, with a respective temple being pivotally connected to each of these portions and formed with an earpiece.

When the spectacles are worn, the frame is supported on the nose of the wearer by the bridgepiece, the lenses are located in front of the eyes, and the temples extend rearwardly along the sides of the head and may engage, e.g. with earpieces, behind the ears of the wearer.

Spectacles have been provided for a wide variety of purposes only some of which need be alluded to here. For example, they may be provided as ordinary eyeglasses with corrective lenses or lenses intended to assist in normal vision, either fabricated specially for the user or to provide magnification or some other special effect.

Sunglasses, for example, may be used as filters or attenuators to protect the eyes from the sun, while stereoscopic glasses may be used to provide three-dimensional illusions in viewing three-dimensional displays in which two distinct images are created by polarized light or color effects.

Colored-lens glasses may also be used simply as novelty items without sunlight filtering effects.

Spectacles may also be used to protect the eyes against vapors, the spattering of liquids and flying particulates.

For conventional frames, synthetic resin materials may be used or other materials such as wire and metals can be employed in whole or in part. Disposable or single-use spectacles, e.g. as sunglasses or for viewing three-dimensional motion pictures may be distributed widely at low cost and may utilize materials such as cardboard or paperboard.

In recent years, a compact construction has been desired. In the standard mode of use, the temples of a pair of spectacles are permanently hinged at the outer ends of the frame to allow the temples to be swung inwardly and enable the folded pair of glasses to be inserted into a standard sleeve, into a pocket or otherwise stored. Sometimes a hinge or flexible connection is provided at the bridge piece to enable the spectacles to be folded into a somewhat more compact configuration.

While these systems have proved to be relatively compact, they invariably are somewhat bulky and it is desirable in some cases to provide an extremely flat construction.

OBJECTS OF THE INVENTION

It is the principal object of the present invention to provide an improved spectacle structure which has a more desirable configuration than earlier spectacles but which nevertheless has greater versatility.

Still another object of the invention is to provide a simple compact spectacle construction avoiding disadvantages of prior art systems.

Yet another object of this invention is to provide a compact spectacle construction extending the principles of our copending application and the prior application identified above.

SUMMARY OF THE INVENTION

These objects and others which will become more readily apparent hereinafter are attained, in accordance with the invention, in which is provided a spectacle frame provided with at least one longitudinal channel extending across the lens-receiving portion of the frame and through a bridgepiece thereof while opening at an end of the frame to enable a temple to be at least in part retracted from this channel and to be swung into a position of use in which this temple lies substantially transverse to the plane of the frame and channel.

Generally, the channel will accommodate two such temples, each of which can be extended from the channel in a respective direction generally linearly before the temple is swung into its use position.

This arrangement has the advantage that the temples are largely received within the frame while the latter retains its flat and preferably planar construction, without requiring folding of the temples or even telescoping of various sections of a temple into one another, systems which increase the complexity of manufacture and use. While the invention is applicable to the use of any materials, it can be carried out utilizing temples of plastics material, wire and other materials which are commonly utilized in spectacles.

According to a feature of the invention, each temple is provided with an earpiece which may continue to project when the temple is otherwise received in the respective channel so that the earpiece can serve as a grip enabling the temple to be extended from the channel.

Alternatively, the earpiece may be partly received within the frame in a more compact construction.

The free end of the temple remote from the earpiece can be shaped, e.g. with a head or transverse formation, to prevent the shank of the temple from being fully extracted from the channel.

The frame of the spectacle can be molded in one or more pieces from a synthetic resin material. Especially in the latter case, it has been found to be advantageous to provide two distinct and parallel channels to accommodate the respective temples which can be more or less rigid and can be provided with means in their inner ends to enable the swinging motion of each temple about a hinge point at the end of the respective channel.

In this case, each channel may open only at a respective side of the frame and may be closed at the opposite side of the frame.

One of the channels may lie in front of the other or the channels may be provided one above the other.

Advantageously, in the embodiment in which the temples are rigid, an earpiece can be hingedly connected to the temple so as to be able to swing between a position in which the elongated earpiece lies substantially at a right angle to the respective temple into a position in which the earpiece includes an obtuse angle therewith.

In the first of these positions, the earpiece can lie close to the side of the frame for a compact construction of the spectacles when the temples are retracted in their respective channels while the second position corresponds to a position of use and is, of course, more comfortable for the user.

Detent means may be provided between the earpiece and the temple to index the earpiece relative to the temple in each of the two positions previously described or in additional positions of adjustment to accommodate the predilections or requirements of the user.

Advantageously, the channels are formed by upper and lower frame members which are held together by a channel formed on a lens-carrying member which depends from the channel-forming structure and can be provided with any nosepiece engaging the bridge of the nose of the wearer.

According to the present invention, more particularly, a pair of spectacles comprises:

a relatively rigid bar adapted to lie along the brows of a wearer above the bridge of the nose of the wearer and curved substantially to follow a contour of the head of the wearer from one end of the bar to an opposite end thereof, the bar being formed with curved channel means conforming to the curvature of the bar and opening at the ends;

respective flexible elongated temples received in the channel means and extractable therefrom from the respective ends of the bar, each of the temples being provided at one extremity with means hingedly connecting it with a respective one of the ends upon extraction from the channel means and, at an opposite extremity with an earpiece; and lens means mounted on the bar and forming a pair of lenses positioned ahead of the eyes of the user.

In another aspect of the invention, the pair of spectacles can comprise:

a bar adapted to lie along the brows of a wearer above the bridge of the nose of the wearer, the bar being formed with channel means opening at opposite ends of the bar;

respective elongated temples received in the channel means and extractable therefrom from the respective ends of the bar, each of the temples being provided at one extremity with means hingedly connecting it with a respective one of the ends upon extraction from the channel means and, at an opposite extremity with an earpiece;

lens means mounted on the bar and forming a pair of lenses positioned ahead of the eyes of the user; and resilient detent means at each of the ends deflectable by the temples for retaining the temples in respective use positions in which the temples lie generally transverse to the bar.

According to the contribution of the present application, therefore, the curved channel means of the rigid bar which is adapted to lie along the brow of the wearer accommodates highly flexible temples, i.e. temples which are composed of a synthetic resin and can be bent back on themselves, looped or even knotted and which can be slid into and out of the channel means so that the temples easily accommodate themselves to the curvature of the bar and, when extracted from the channel means, also accommodate themselves to the head of the wearer in a wrap-around manner.

According to an important aspect of the invention, the lens means can consist of a single element formed with both lenses and which can be snapped into or onto the bar.

According to one embodiment of the invention, the lens means is formed with a channel which clips onto the bar. Preferably, however, the bar is formed with a channel along its front side, into which the upper edge of the lens means can be clipped.

This allows the lens structure to be replaced at the option of the wearer and it is contemplated that the wearer will be supplied with or will acquire a variety of such lens units each with a different degree of transparency or ability to obstruct or prevent the transmission of damaging rays from the sun so that the wearer can simply and easily select the particular lens unit required for the environment in which the spectacles will be worn.

Of course, when the spectacles are not intended as sunglasses, but rather are to serve as corrective glasses, the wearer may select among distance, reading or intermediate lens units.

As noted, it is an important feature of the invention that the ends of the bar be provided with detent means for indexing the outwardly swung temples in their use positions after the temples have been extracted form the channel means.

When the bar is fabricated from upper and lower sections which are bonded together, at each end each of these sections can be formed with a respective tongue having a projection in the path of the temple and outwardly deflectable when the respective temple is extracted from the respective end of the bar and then swung inwardly in the use position.

BRIEF DESCRIPTION OF THE DRAWING

The above objects, features and advantages of the present invention will become more readily apparent from the following description, reference being made to the accompanying drawing in which.

SPECIFIC DESCRIPTION

Figure 1:
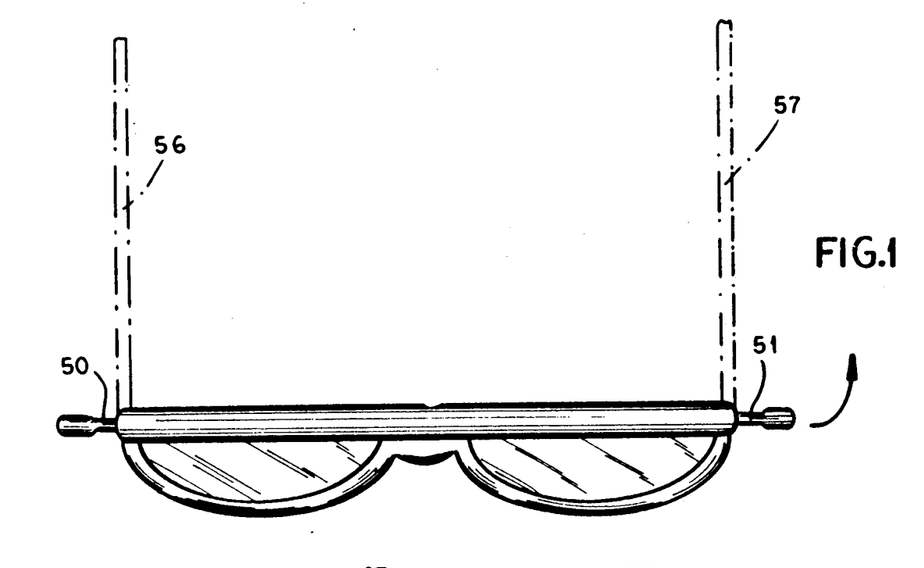
FIG. 1 is a top view of a pair of spectacles utilizing the principles of the invention and showing the temples retracted in solid lines, but extended in a dot-dash view.
Figure 2:
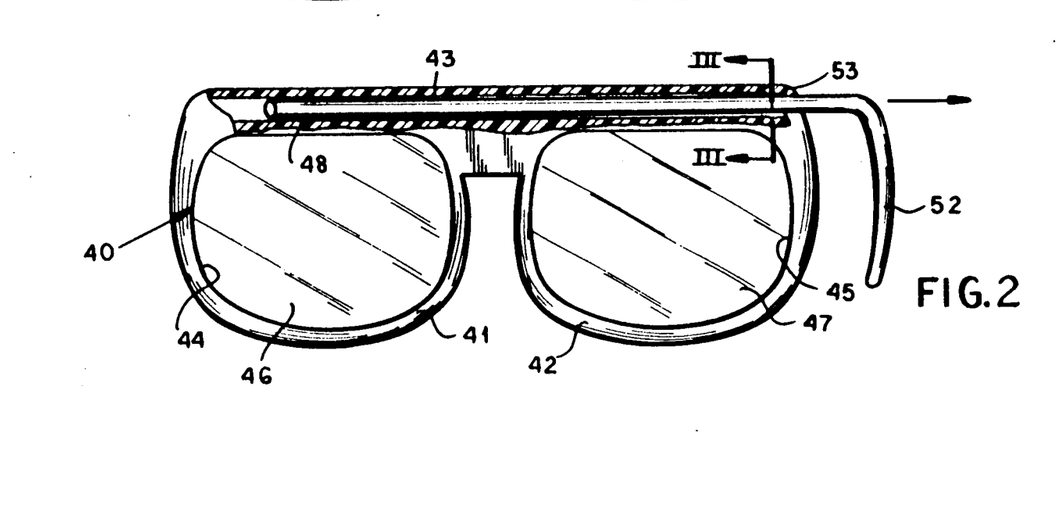
FIG. 2 is a front-elevational view, partly broken away of the spectacles.
Figure 3:
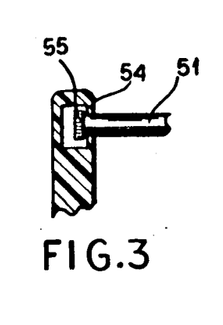
FIG. 3 is a detail view in section along the line III—III of FIG. 2.

In FIGS. 1-3, we have shown an embodiment in which the generally flat character of the spectacles is retained.

The frame 40 can comprise a pair of lens-receiving portions 41 and 42 interconnected by a bridgepiece 43, molded rigid therewith. The portions 41 and 42 are provided with windows 44, 45 each of which receives a lens 46, 47. In this embodiment, a channel 48 is provided in the linear rigid member formed by the upper parts of members 41 and 42 and by the bridgepiece 43.

Figure 4:
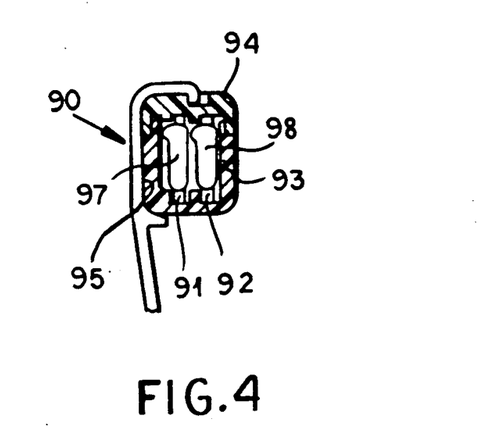
FIG. 4 is a section through a rigid-frame spectacle of the invention having two channels for respective rigid temples lying in a front-to-back relationship according to the invention.
Figures 5, 10:
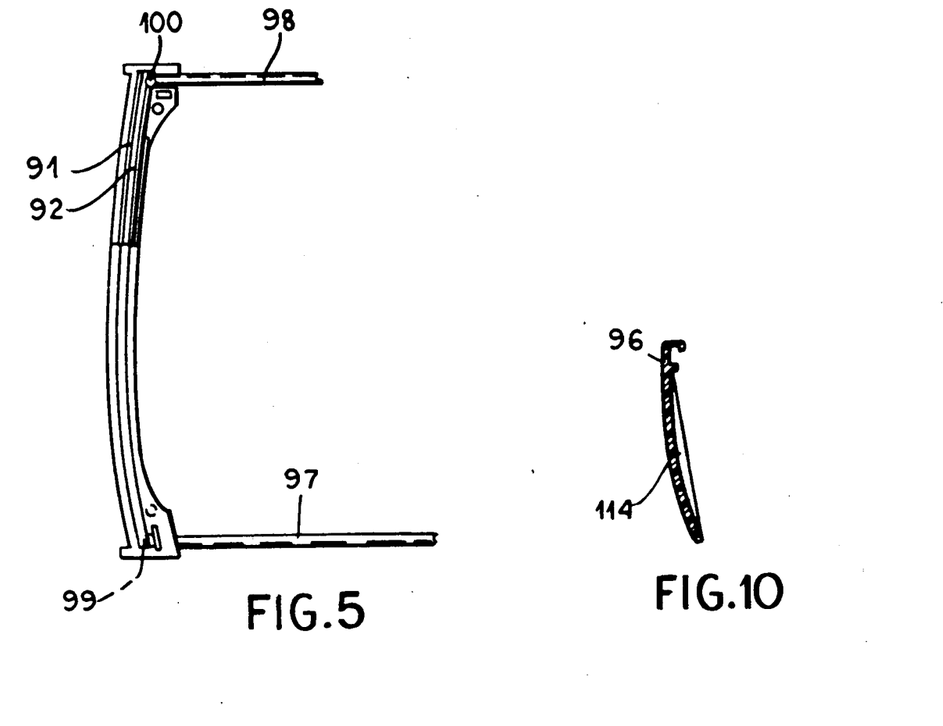
FIG. 5 is a top view with part of the cover broken away to show the two channels.
FIG. 10 is a section through the lens-forming member.

While a common channel is utilized to receive the two temples 50 and 51 (only one of which is shown in FIGS. 2 and 3), it will be understood that separate channels can also be employed, if desired (see FIGS. 4 and 5). Each of the temples 50, 51, is formed with an earpiece 52 and projects through a passage 53 at the respective end of the frame so that the temple can be retracted through this passage and swung into a rearwardly open slot 54 (FIG. 3), the retraction being limited by an enlarged head 55 at the end of the temple.

Thus in the retracted position shown in FIGS. 1 and 2 in solid lines, the temples are practically completely received within the channel and only the earpieces 52 remain exposed and are coplanar substantially with the balance of the frame. When, however, the temples are retracted, they can be swung into the normal use position shown in dot-dash lines at 56 and 57 to engage the head of the wearer. It is also possible to form the channels from a tubular member which can be applied to the frame element, e.g. by heat sealing, adhesive bonding or other conventional means.

These principles have been extended in the embodiment of FIGS. 4 and 5 to a frame 90 in which a pair of channels 91 and 92 in a front-and-back relationship are provided in a rigid bar extending above both lenses and across the bridge of the spectacles. This bar is constituted by a base 93 and a cover 94, each of which can be injection molded from synthetic resin material and which, when interfitted as shown in FIG. 4, define the two channels. The two members 93 and 94 may be held together by a channel-shaped portion 95 of the lens-forming member 96. As can be seen from FIGS. 4 and 5, each of the channels 91 and 92 receives a respective temple 97, 98, the temples being shown in their swung-out positions in FIG. 5 where the two channels 91 and 92 are also visible. Hinge formations are provided at 99 and 100 for the temples to enable them, when they each reach the end of the respective channels, to be swung outwardly into the position shown in FIG. 5.

Figure 6:
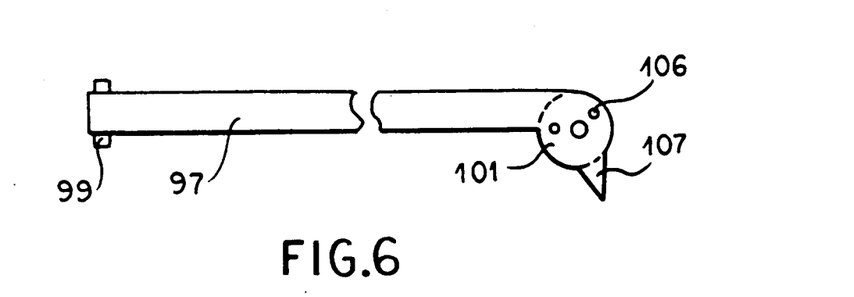
FIG. 6 is a side view of one of the temples showing part of the indexing means thereof.
Figure 7:
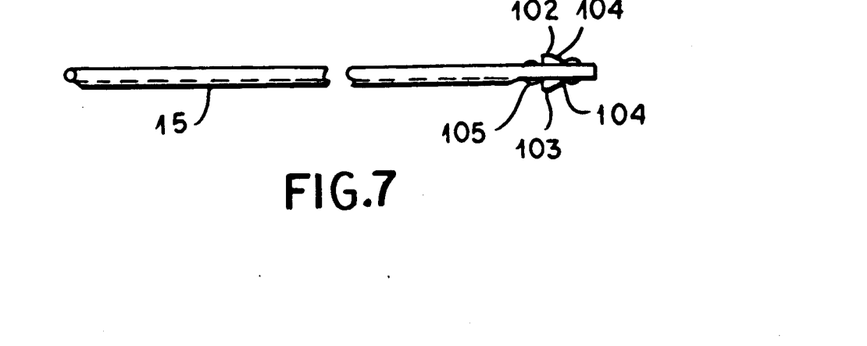
FIG. 7 is a top view of this temple.

The temples are each provided with earpieces as has been shown for the temple 97 in FIGS. 6 and 7. More particularly, each temple is formed at its free end with a hollow circular lug 101 with a pair of pins 102, 103 projecting in opposite directions so as to form a pintle for the earpiece which can be slipped over the lug. The pintle has ramps 104 which facilitate spreading of the bifurcated end of the earpiece to ensure that it will snap over a pivot upon the pintle.

A pair of bumps 105, 106 is provided on each lug to form detent means for the earpiece and a stop in the form of a projection 107 is likewise provided on this lug.

Figure 8:
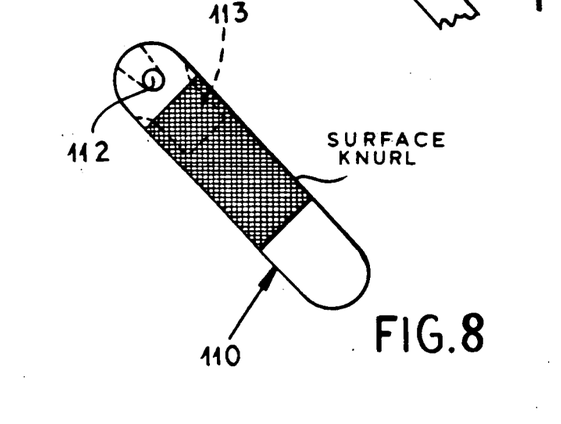
FIG. 8 is a side view of the earpiece adapted to cooperate with this temple.
Figure 9:
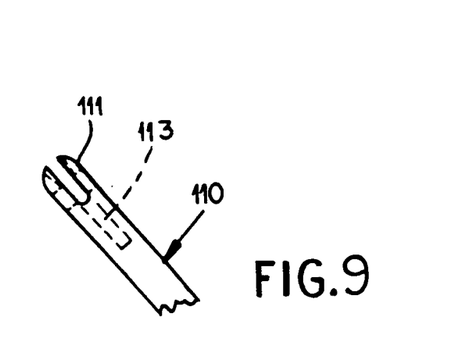
FIG. 9 is a top view of a portion of this earpiece.

The earpiece is best seen in FIGS. 8 and 9 and has been represented at 110. It has a bifurcated end 111 which is adapted to snap over the pintle and has a bore 112 into which the pintle fits to allow a limited pivoting movement of the earpiece on the temple. A cavity 113 in the pintle accommodates the projection 107.

Figure 11:
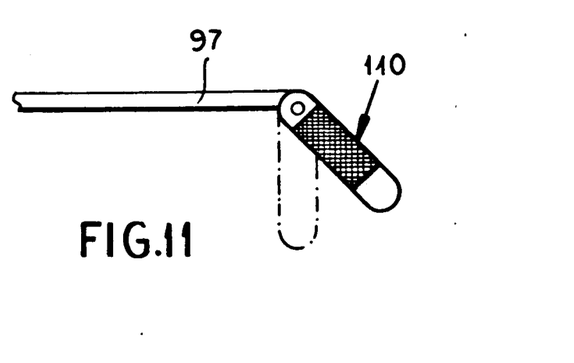
FIG. 11 is an elevational view with the earpiece in place showing an alternative position in dot-dash lines.
Figure 12:
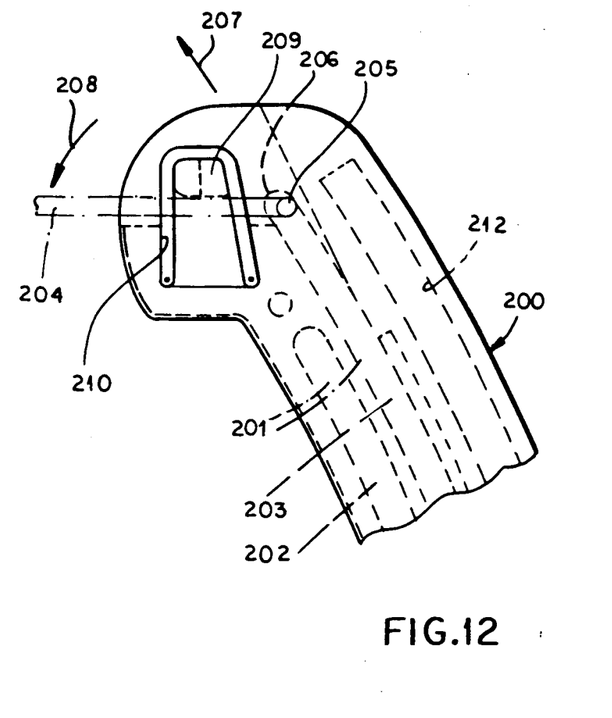
FIG. 12 is a top view of one end of the bar of the invention.

The earpiece 110 (FIG. 11) can thus be indexed in either of the two positions shown, i.e. in the dot-dash position in which the earpiece is substantially at a right angle to the temple so that it will lie close to the side of the frame and provide a compact configuration when the temple is fully inserted in its channels, and in the solid-line position in which the earpiece may be rotated for use. Other detent means or ratchet configurations may be provided to allow for additional positions which comfort so warrants.

FIG. 10 shows the lens member 96 in greater detail, the lens being seen at 114.

From FIGS. 12-17, it will be apparent that the bar 200 which is adapted to lie along the brow of the wearer and is curved, is formed with channel means 201 consisting of two channels 202 and 203 receiving respective temples, only one of which has been indicated in dot-dash lines at 204. The pin 205 at the end of the temple 204 is shown to have engaged in the circular extremity 206 of channel 203, as the temple 204 has been extracted form the end of the bar 200 in the direction of arrow 207 to enable this temple to swing as represented by the arrow 208 in the counterclockwise sense past detent illustrated as a tongue 209.

The temple 204 can be highly flexible and bendable so that it can easily be accommodated in the channel 203 and has an earpiece as described in connection with FIGS. 6-9 and 11 at its other extremity, not shown. The other temple is constructed similarly and of course slides in the channel 202 to be extracted from the opposite end of the bar 200.

The detent tongue 209 is formed integrally with the upper section of the bar 200 which is visible in FIGS. 12-15 and is molded from synthetic resin material, so that the tongue can be deflected within a window 210 formed in the bar.

Figure 13:
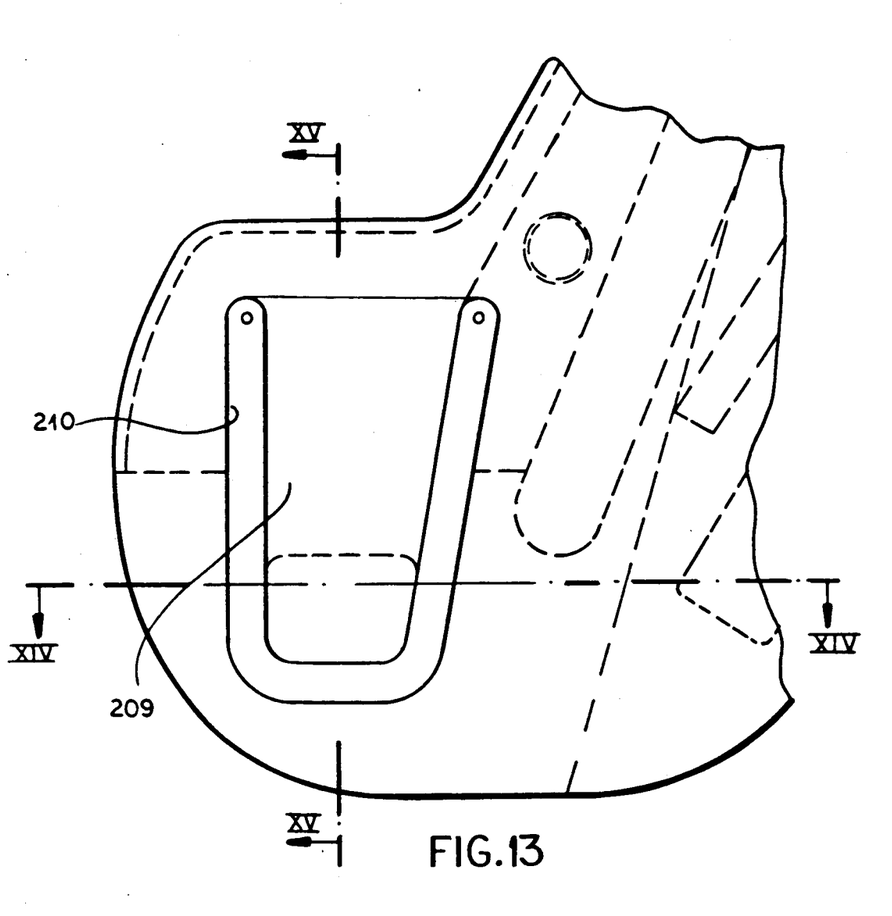
FIG. 13 is a top view of the opposite end of the bar drawn to a larger scale than FIG. 12.
Figure 14:
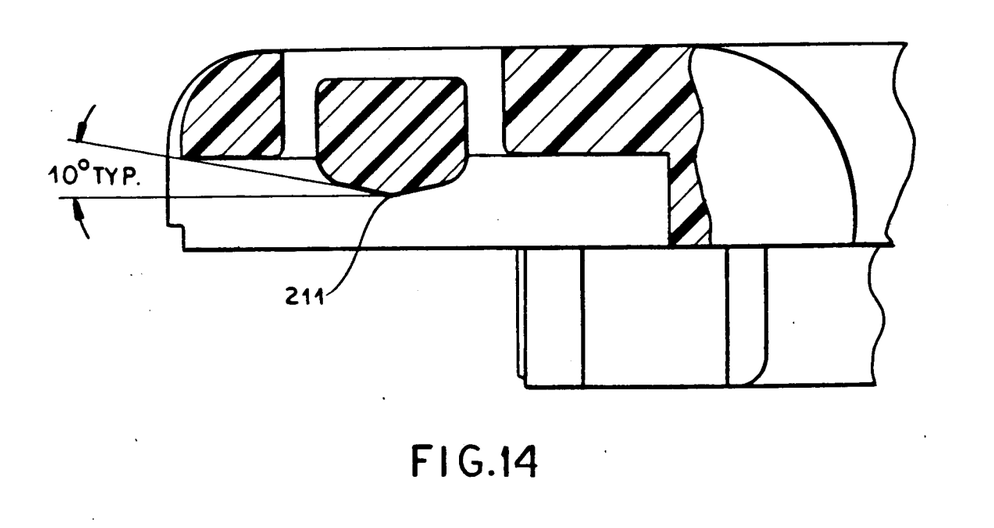
FIG. 14 is a cross-sectional view taken along the line XIV—XIV of FIG. 13.
Figure 15:
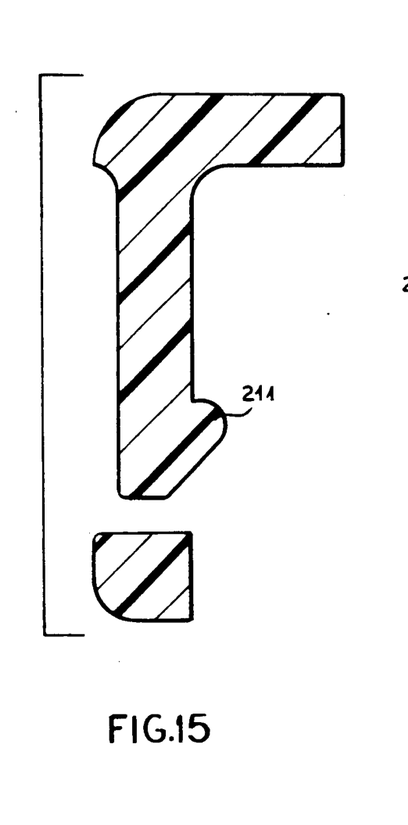
FIG. 15 is a cross sectional view taken along the line XV—XV of FIG. 13.

Turning to FIGS. 13-15, which show the opposite end of the bar, it can be seen that the tongue 209 in the window 210 can have a downward projection 211 which can be deflected upwardly by the temple as it is swung from its extracted position inwardly and thereby retain the temple in its use position alongside the head of the user.

Figure 18:
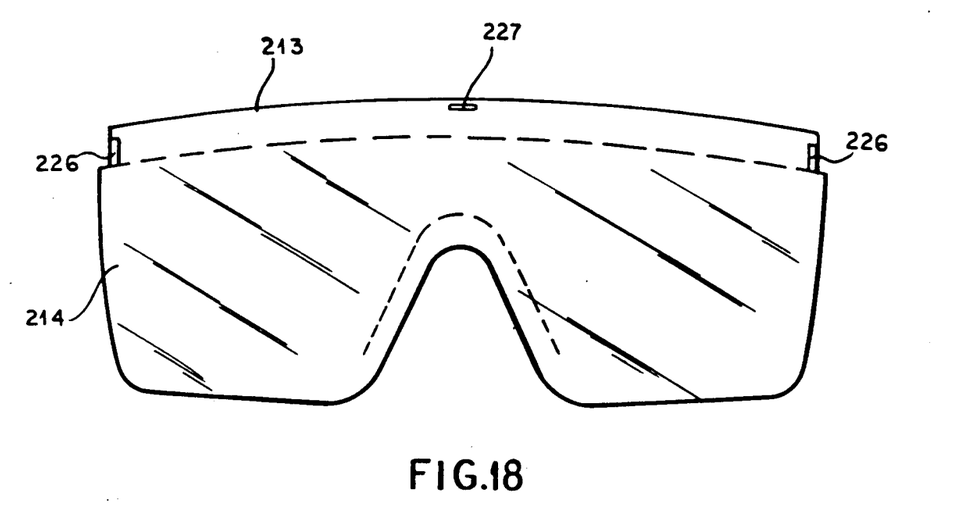
FIG. 18 is an elevational view of a lens unit for use with the bar of FIGS. 12-17.
Figure 19:
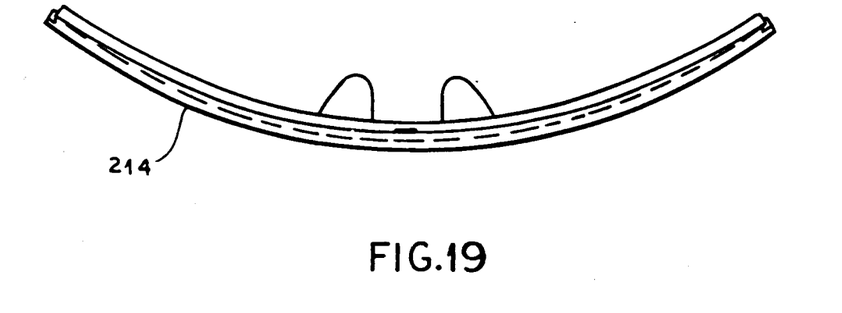
FIG. 19 is an elevational view of this lens unit.

In addition, the upper member of the bar is formed with a channel 212 into which the upper edge 213 of a lens unit 214 (FIGS. 18 and 19) can clip as will be described.

Figure 16:
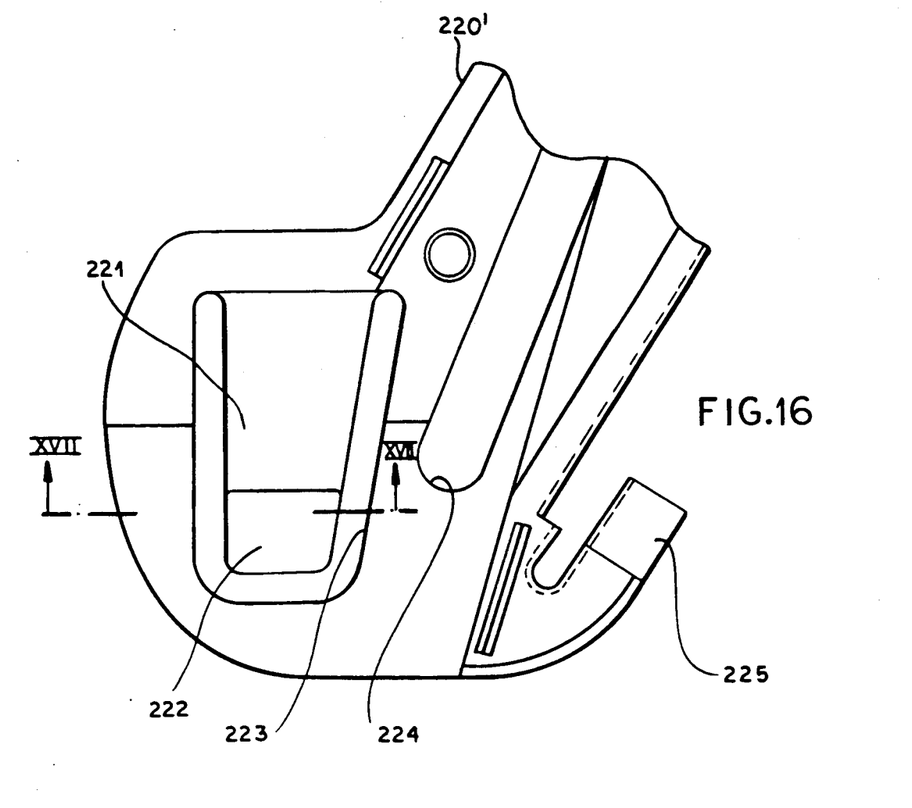
FIG. 16 is a plan view of the lower bar section at the end illustrated in FIG. 13 and drawn to the same scale.
Figure 17:
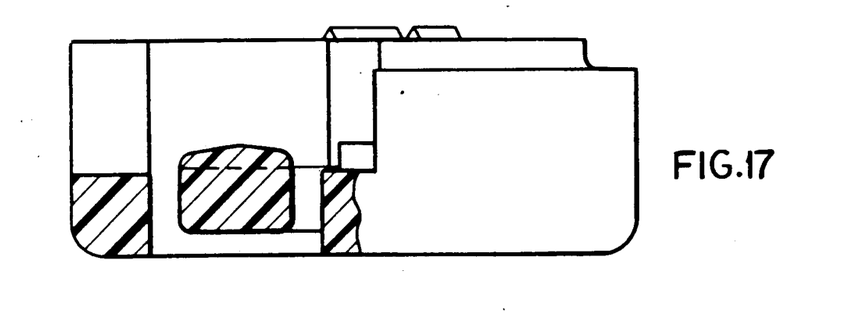
FIG. 17 is a cross sectional view taken along the line XVI—XVI of FIG. 15.

As can be seen from FIG. 16, the lower member 220 of the bar is also formed with a tongue 221 and a projection 222 forming a detent deflectable in a window 223. In this case, the tongue 221 is deflectable downwardly as the temple is swung past it into the use position, The lower member is formed with channels corresponding to the channels 202 and 203 of the channel means and registering with them when the members are assembled to form the bar. In the illustration in FIG. 16, however, only the channel 224 which registers with the channel 202 is visible.

FIG. 16 also shows that on the front side of the bar, to retain the lens unit, an inwardly extending lug 225 can be provided to engage a notch 226 at the respective side of the lens unit. Obviously a similar mirror-symmetrical lug is provided at the opposite end of the bar.

Because the lugs engage in the notches 226 and the channel 212 has a recess receiving a projection 227 along the upper edge of the lens unit, the lens unit can be inserted replaceably with a snap fit in the channels 212 to be retained by the lugs. The lens units are therefore replaceable as has been described.

We claim:

1. A pair of spectacles, comprising:
    a relatively rigid bar adapted to lie along the brows of a wearer above the bridge of the nose of the wearer and curved substantially to follow a contour of the head of the wearer from one end of said bar to an opposite end thereof, said bar being formed with curved channel means conforming to the curvature of the bar and opening at said ends;
    respective flexible elongated temples received in said channel means and extractable therefrom from the respective ends of said bar, each of said temples being provided at one extremity with means hingedly connecting it with a respective one of said ends upon extraction from said channel means and, at an opposite extremity with an earpiece; and
    lens means mounted on said bar and forming a pair of lenses positioned ahead of the eyes of the user.

2. The pair of spectacles defined in claim 1 wherein said bar is formed on a front surface with a pair of inwardly extending lugs reaching over said lens means and retaining same on said bar.

3. The pair of spectacles defined in claim 2 wherein said lens means is formed in one piece with said pair of lenses and has a formation engageable in an overhanging ridge of said bar.

4. The pair of spectacles defined in claim 2 wherein said lens means is formed with respective notches resiliently receiving projections on the respective lugs.

* * * * *